US006266090B1

United States Patent
Tseng et al.

(12) 
(10) Patent No.: US 6,266,090 B1
(45) Date of Patent: Jul. 24, 2001

(54) DEVICE FOR CONTROLLING A ROTATION OF A LENS IN A DIGITAL CAMERA

(75) Inventors: Kou-Lung Tseng, Hsinchu; Chien-Chin Chan, ChuPei; Guang-Shang Chang, Taichung; Chin-Shui Lin, Yung Ho; Chih-Wen Pan, Taipei; Chi-Wen Lin, Hsinchu, all of (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/002,506

(22) Filed: Jan. 2, 1998

(51) Int. Cl.[7] .................................................. H04N 5/225
(52) U.S. Cl. ............................ 348/335; 348/375; 348/207
(58) Field of Search .................................... 348/207, 373, 348/374, 375, 376, 335, 340, 239; 396/428; H04N 5/232

(56) References Cited

U.S. PATENT DOCUMENTS 5,557,329 * 9/1996 Lim ...................................... 348/373
5,767,905 * 6/1998 Archambo ............................ 348/373
6,027,257 * 2/2000 Richards et al. ..................... 396/428
6,124,892 * 9/2000 Nakamo ............................... 348/373

FOREIGN PATENT DOCUMENTS 63-287176 * 11/1988 (JP) ............................. H04N/5/232
2-153685 * 6/1990 (JP) ............................. H04N/5/232

* cited by examiner

*Primary Examiner*—Tuan Ho

(57) ABSTRACT

A device for controlling a rotation of a lens in a digital camera includes a lens connected to and exposed out of the housing of a digital camera and a motor disposed within the housing of the digital camera. The lens is provided with a shaft which extends through the housing to have an end extending into the interior of the housing which is disposed with a follower gear. The motor has a drive spindle which is disposed with a driving gear. A set of reduction gears are disposed between and engageable with the follower gear on the shaft of the lens and the driving gear on the drive spindle of the motor. By means of the rotation of the motor, the lens is rotatable horizontally, while the digital camera remains stationary, to a desired direction in order to take a picture.

1 Claim, 3 Drawing Sheets

DEVICE FOR CONTROLLING A ROTATION OF A LENS IN A DIGITAL CAMERA

FIELD OF THE INVENTION

The present invention relates to a digital camera and in particular to a device for controlling a rotation of a lens in a digital camera for providing a broad angle of photographing.

BACKGROUND OF THE INVENTION

Conventionally, digital cameras include a lens and a housing and the lens is fixed on the housing and is not rotatable. Therefore, when a digital camera is used to take a picture, the digital camera can only photograph a scenery which is right in the front of the digital camera. However, if the digital camera is used to photograph a scenery in other directions, the digital camera must be rotated so that the desired photographing scenery is right in the front of the digital camera.

Thus, it is desirable to have a device for controlling a rotation of a lens in a digital camera to solve the above problems.

SUMMARY OF THE INVENTION

The principal object of the present invention is to provide a device for controlling a rotation of a lens in a digital camera, by which the lens can be rotated horizontally, while the digital camera is not rotated, to a desired direction so as to take a picture.

In accordance with the present invention, there is provided a device for controlling a rotation of a lens in a digital camera, comprising a lens connected to and exposed out of the housing of a digital camera and a motor disposed within the housing. The lens is provided with a shaft which extends through the housing to have an end of the shaft extending into the interior of the housing which is disposed with a follower gear. The motor is formed with a drive spindle and the drive spindle is disposed with a driving gear. A set of reduction gears are disposed between the follower gear on the shaft of the lens and the driving gear on the drive spindle of the motor. By means of the rotation of the motor, the lens can be rotated horizontally, while the digital camera is not rotated, to a desired direction in order to take a picture.

BRIEF DESCRIPTION OF THE DRAWINGS

The present invention will be better understood from the following description of preferred embodiments thereof, with reference to the attached drawings, wherein.

DETAILED DESCRIPTION OF THE PREFERRED EMBODIMENTS

Figure 1:
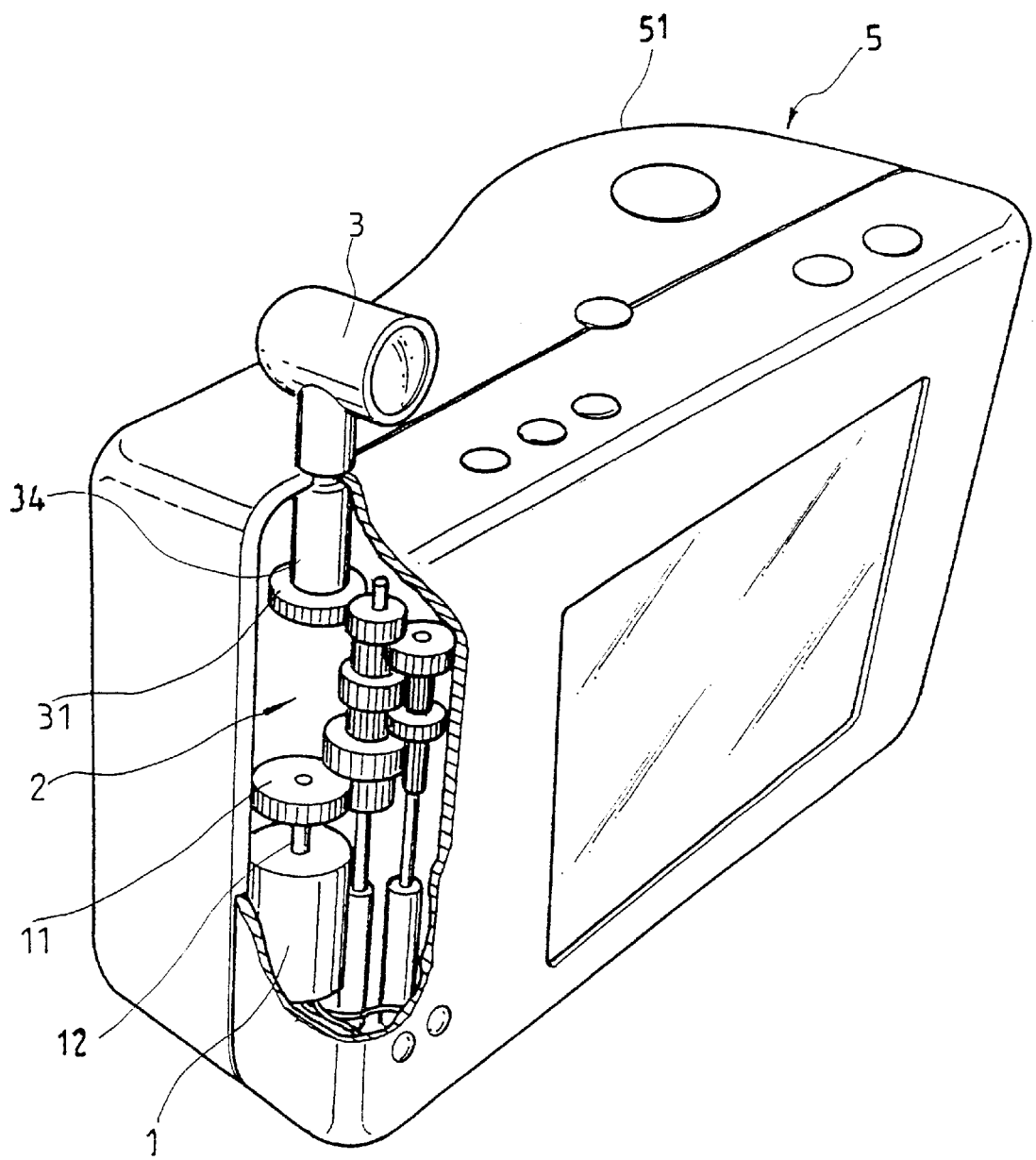
FIG. 1 is a partial cross-sectional view showing a device for electrically controlling a rotation of a lens in a digital camera in accordance with an embodiment of the present invention.

With reference to the drawings and in particular to FIG. 1, wherein a device for electrically controlling a rotation of a lens in a digital camera in accordance with the present invention is shown, the device comprises a lens 3 connected to and exposed out of the housing 51 of a digital camera 5 and formed with a shaft 34 extending through a hole of the housing 51 into the interior of the housing 51. The end of the shaft 34 extending into the interior of the housing 51 is disposed with a follower gear 31. A motor 1 which is formed with a drive spindle 12 is disposed within the housing 51 and activated by a power source (not shown) of the digital camera 5. The drive spindle 12 is disposed with a driving gear 11. A set of reduction gears 2 are disposed between and engageable with the follower gear 31 and the driving gear 11. When the motor 1 is activated, the driving gear 11 on the drive spindle 12 of the motor 1 drives the reduction gears 2 which in turn drive the follower gear 31 on the shaft 34 of the lens 3 so that the lens 3 can be rotated horizontally to a desired direction.

Figure 2:
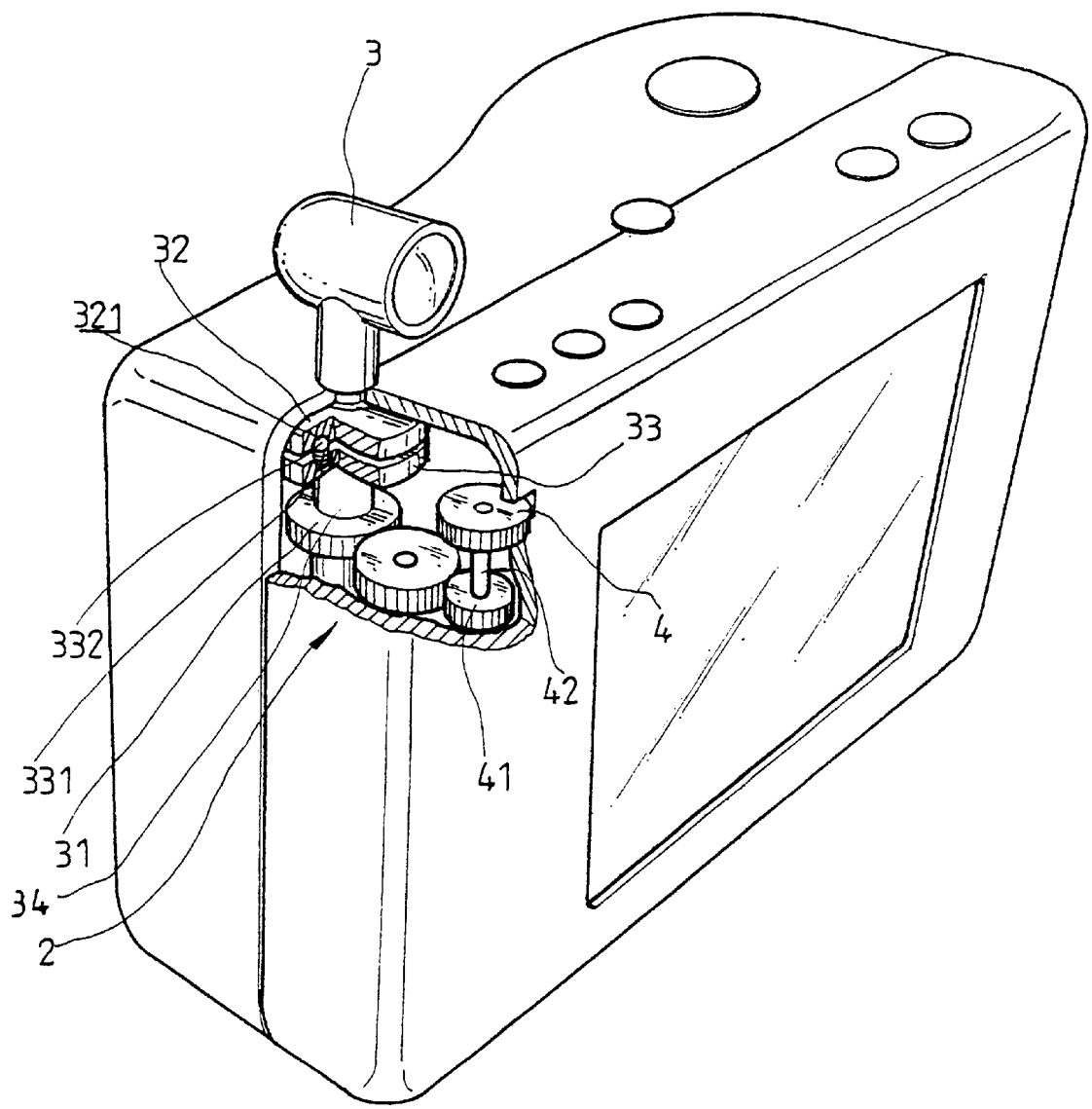
FIG. 2 is a partial cross-sectional view showing a device for manually controlling a rotation of a lens in a digital camera in accordance with another embodiment of the present invention.
Figure 3:
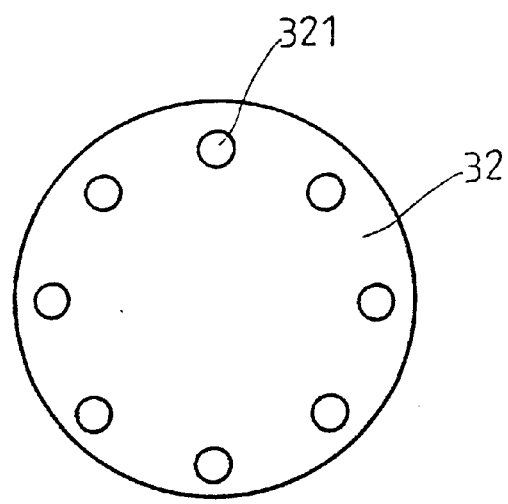
FIG. 3 is a bottom view showing a directional plate in accordance with the embodiment of FIG. 2.
Figure 4:
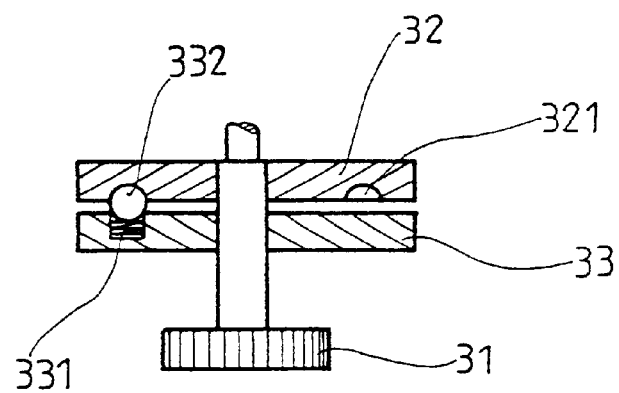
FIG. 4 is a cross-sectional view showing the engagement between the directional plate of FIG. 3 and a ball on a fixing plate in accordance with the embodiment of FIG. 2.

With reference to FIG. 2 which shows a device for manually controlling a rotation of a lens in a digital camera in accordance with another embodiment of the present invention, the device comprises a lens 3 connected to and exposed out of the housing 51 of a digital camera 5 and formed with a shaft 34 extending through a hole of the housing 51 into the interior of the housing 51. The end of the shaft 34 extending into the interior of the housing 51 is disposed with a follower gear 31. A directional plate 32 which is provided with a bottom side is disposed on the shaft 34 above the follower gear 31. The bottom side of the directional plate 32 is formed with a plurality of notches 321 equally-spaced from each other (as shown in FIG. 3). A revolving member 4 which has a central axle 42 is disposed within the housing 51 with a driving gear 41 fixed on the central axle 42. A set of reduction gears 2 are disposed between and engageable with the follower gear 31 and the driving gear 41. The revolving member 4 is partially exposed out of the housing 51 for conveniently rotating. A fixing plate 33 is fixed within the housing 51 and formed with a concave in which a spring member 331 is disposed. A ball 332 is disposed on the other end of the spring member 331 and engagable with one of the notches 321 of the directional plate 32 (as shown in FIG. 4). When the revolving member 4 is rotated, the driving gear 41 on the central axle 42 of the revolving member 4 drives the reduction gears 2 which in turn drive the follower gear 31 on the shaft 34 of the lens 3 so that the lens 3 can be rotated horizontally to a desired direction. Further, when the lens 3 is rotated by the reduction gears 2 which drive the follower gear 31 on the shaft 34 of the lens 3, the directional plate 32 is rotated simultaneously and then one of the notches 321 of the directional plate 32 is engaged with the ball 332 so that the lens 3 is rotated horizontally to a certain angle and located at a precise angular position.

The present invention has been particularly shown and described with reference to the preferred embodiments thereof, it will be understood to those skilled in the art the various changes in form and details may be made therein without departing from the spirit and scope of the invention.

What is claimed is:

1. A device for controlling a rotation of a lens in a digital camera, comprising: a lens connected to and exposed out of a housing of said digital camera, said lens being formed with a shaft extending through said housing, said shaft having a lower end extending into interior of said housing, said lower end being disposed with a follower gear.

* * * * *